US009264172B2

(12) United States Patent
Rival et al.

(10) Patent No.: US 9,264,172 B2
(45) Date of Patent: Feb. 16, 2016

(54) METHOD OF OPTICAL DATA TRANSMISSION USING POLARIZATION DIVISION MULTIPLEXING

(75) Inventors: Olivier Rival, Bourg la Reine (FR); Francesco Vacondio, Paris (FR)

(73) Assignee: Alcatel Lucent, Boulogne-Billancourt (FR)

(*) Notice: Subject to any disclaimer, the term of this patent is extended or adjusted under 35 U.S.C. 154(b) by 71 days.

(21) Appl. No.: 14/000,280

(22) PCT Filed: Mar. 5, 2012

(86) PCT No.: PCT/EP2012/053746
§ 371 (c)(1),
(2), (4) Date: Aug. 19, 2013

(87) PCT Pub. No.: WO2012/130562
PCT Pub. Date: Oct. 4, 2012

(65) Prior Publication Data
US 2014/0050477 A1    Feb. 20, 2014

(30) Foreign Application Priority Data
Mar. 25, 2011    (EP) .................................... 11305334

(51) Int. Cl.
*H04B 10/00* (2013.01)
*H04J 14/06* (2006.01)
(Continued)

(52) U.S. Cl.
CPC .............. *H04J 14/06* (2013.01); *H04B 10/532* (2013.01); *H04B 10/614* (2013.01); *H04J 14/002* (2013.01)

(58) Field of Classification Search
USPC .................. 398/140–141, 152, 159, 184, 205
See application file for complete search history.

(56) References Cited

U.S. PATENT DOCUMENTS 5,384,635 A * 1/1995 Cohen et al. ................. 356/73.1
6,459,830 B1 * 10/2002 Pua et al. ....................... 385/24
(Continued)

FOREIGN PATENT DOCUMENTS

CN    101505192    8/2009
CN    101557260    10/2009
(Continued)

OTHER PUBLICATIONS

Hill, P.M. et al; Optical Polarization Divison Multiplexing at 4 Gb/s; IEEE Photonics Technology Letters, IEEE Service Center, Piscataway, NJ, US; vol. 4, No. 5, May 1, 1992; pp. 500-502; XP011410355; ISSN: 1041-1135; DOI: 10.1109/68.136500.
(Continued)

*Primary Examiner* — Agustin Bello
(74) *Attorney, Agent, or Firm* — Patti & Malvone Law Group, LLC

(57) ABSTRACT

Proposed is a method of optical data transmission. The method comprises different steps. A first optical signal and a second optical signal are generated, such that the optical signals possess a same wavelength, respective phases, which are modulated in dependence on respective data values, and respective polarization states, which are essentially orthogonal to each other. A combined optical signal is generated, by combining the optical signals, such that the combined optical signal possesses a polarization state with a predetermined variation. The combined optical signal is transmitter over an optical transmission line and received. Two time-discrete sampled signals are generated, by sampling the received optical signal along two orthogonal polarization planes. Two filtered signals are generated, by filtering the time-discrete sampled signals in the time-discrete domain, using a function that is indicative of the respective predetermined variation. Finally, respective data values are derived from the filtered signals.

10 Claims, 4 Drawing Sheets

(51) Int. Cl.
*H04B 10/532* (2013.01)
*H04B 10/61* (2013.01)
*H04J 14/00* (2006.01)

(56) References Cited

U.S. PATENT DOCUMENTS

| | | | |
|---|---|---|---|
| 7,333,611 B1* | 2/2008 | Yuen et al. | 380/256 |
| 7,469,106 B2* | 12/2008 | Feced et al. | 398/202 |
| 7,636,525 B1* | 12/2009 | Bontu et al. | 398/208 |
| 7,903,977 B2* | 3/2011 | MacDonald et al. | 398/152 |
| 8,036,536 B2* | 10/2011 | Ciaramella et al. | 398/147 |
| 8,068,742 B2* | 11/2011 | Cole et al. | 398/152 |
| 8,693,897 B2* | 4/2014 | Mo et al. | 398/208 |
| 8,731,411 B2* | 5/2014 | Oda et al. | 398/208 |
| 8,737,840 B2* | 5/2014 | Nakamoto | 398/152 |
| 2003/0175034 A1* | 9/2003 | Noe | 398/152 |
| 2006/0013597 A1* | 1/2006 | Crivelli et al. | 398/208 |
| 2006/0280509 A1* | 12/2006 | Tomaru et al. | 398/188 |
| 2007/0092260 A1* | 4/2007 | Bontu et al. | 398/152 |
| 2009/0060508 A1* | 3/2009 | Tanimura et al. | 398/65 |
| 2009/0087194 A1* | 4/2009 | Nakashima et al. | 398/158 |
| 2009/0162059 A1 | 6/2009 | Nakamoto | |
| 2009/0245809 A1* | 10/2009 | Nakamoto | 398/159 |
| 2010/0067914 A1* | 3/2010 | Tanaka et al. | 398/102 |
| 2010/0135654 A1* | 6/2010 | Pincemin et al. | 398/25 |
| 2010/0196008 A1* | 8/2010 | Szafraniec et al. | 398/65 |
| 2011/0182589 A1* | 7/2011 | Kotake et al. | 398/152 |
| 2011/0305453 A1* | 12/2011 | Hauske et al. | 398/38 |
| 2014/0050477 A1* | 2/2014 | Rival et al. | 398/65 |

FOREIGN PATENT DOCUMENTS

| | | |
|---|---|---|
| EP | 2109233 | 10/2009 |
| EP | 2154799 | 2/2010 |
| JP | 2009089194 | 4/2009 |
| JP | 2010109705 | 5/2010 |

OTHER PUBLICATIONS

Walker, N. G. et al; Polarization Control for Coherent Communications; Journal of Lightwave Technology; IEEE Service Center, New York, NY, US; vol. 8, No. 3, Mar. 1, 1990; pp. 438-458; XP000136406; ISSN: 0733-8724; DOI: 10.1109/50.50740.

* cited by examiner

METHOD OF OPTICAL DATA TRANSMISSION USING POLARIZATION DIVISION MULTIPLEXING

FIELD OF THE INVENTION

The invention relates to a method of optical data transmission using polarization division multiplexing.

BACKGROUND

In optical data transmission, digital data may be transmitted by modulating the phase of an optical wavelength in dependence on the transmitted data values and in accordance with a constellation diagram of a respective phase-shift keying (PSK) modulation method. Each point of the constellation diagram represents a finite set of data bits that are to be transmitted. Depending on the set of data bits that are to be transmitted, the phase of the optical wavelength is changed, such that it corresponds to the respective point of the constellation diagram. Examples for phase-shift keying modulation methods are Binary Phase-Shift Keying (BPSK), in which each point of the corresponding constellation diagram represents one bit, or Quadrature Phase-Shift Keying (QPSK), in which each point of the corresponding constellation diagram represents two bits.

The set of bits represented by a point of a constellation diagram is called a symbol. The rate, by which the phase of the wavelength is changed and by which therefore symbols are transmitted, is called the symbol rate.

In order to increase the data rate for transmitting data via PSK modulation of a specific optical wavelength, a technique called Polarization Division Multiplexing (PDM) may be exploited. In PDM, for example two optical signals of a same wavelength but with respective orthogonal polarization states are modulated separately using e.g. QPSK at each signal separately, and then combined, thus forming a single optical signal which may then propagates into a fibre link.

At a receiving side, these two optical signals may be recovered from the PDM signal, by sampling the optical field resulting from the combined signal along two polarization planes that are orthogonal to each other. The sampled signals may then be used for deriving respective symbol values from them. From these symbol values, respective data values can be de-mapped.

For further increasing the data rate, not only the technique of PDM may be applied, but also the technique of Wavelength Division Multiplexing (WDM):
PDM is applied separately to different optical signals of different optical wavelengths, and then these optical signals are transmitted over a same optical fibre. On the receiving side, sampling of received optical signals along orthogonal polarization planes is carried out for each respective wavelength.

When transmitting optical signals over a non-ideal optical fibre, different effects such as cross-polarization or cross-phase modulation may cause transmission distortions, which in turn lead to signal degradation of the transmitted optical signals. Such a signal degradation may lead to errors of the transmitted data values, when deriving symbol values from sampled signals on the receiving side and de-mapping the data values from the derived symbol values.

It is a common technique to protect the transmitted data values by Forward Error Correction (FEC). Bit errors of the data values occurring on the receiving side might be compensated, by encoding the data values into a block of bits using a FEC encoding algorithm on the transmitting side, and by then decoding the received block of bits in accordance with the applied FEC algorithm on the receiving side. A FEC algorithm is able to correct only a maximum number of bit errors per FEC block.

SUMMARY

It has been observed by the inventors, that when transmitting data values using the above mentioned techniques of PDM and/or WDM, the number of bit errors—or the bit error ratio (BER)—caused by transmission distortions is not constant over time. A peak of bit errors—or a peak of the BER—is called a burst of bit errors. Such a burst may lead to FEC blocks, for which the number of correctable bits is exceeded. Therefore, transmitted data values may remain uncorrected on the receiving side after FEC decoding. It is therefore an aim of the invention to improve the known method of data transmission.

Proposed is a method of optical data transmission. The method comprises different steps. A first optical signal and a second optical signal are generated, such that the optical signals possess
  a same wavelength,
  respective phases, which are modulated in dependence on respective data values and in accordance with a phase-shift keying method,
  respective polarization states, which are essentially orthogonal to each other.

A combined optical signal is generated, by combining the first and the second optical signal, such that the combined optical signal possesses a polarization state with a predetermined variation. The combined optical signal is transmitted over an optical transmission line and received.

Two time-discrete sampled signals are generated, by sampling the received combined optical signal along two orthogonal polarization planes. Two filtered signals are generated, by filtering the time-discrete sampled signals in the time-discrete domain, using a function indicative of the predetermined variation. Respective data values are derived from the filtered signals.

In order to appreciate the achievements of the proposed method, the following considerations have to be taken into account.

As previously outlined, transmission distortion may be caused by phenomena such as cross-polarization modulation and/or cross-phase modulation.

Cross-polarization modulation is an effect that occurs between two polarization planes for optical signals of a same wavelength. Cross-phase modulation is an effect that describes an impact of an optical signal possessing a specific optical wavelength onto the phase of another optical signal possessing a different optical wavelength. Cross-polarization modulation and cross-phase modulation themselves are caused by non-linear effects of an optical fibre, such as for example the Kerr effect. The extent to which such non-linear effects occur, depends on the signal power of the optical signals present within the fibre. When using PDM and/or WDM for optical data transmission, multiple optical signals are transmitted over a same fibre. Each transmitted optical signal possesses a respective signal power with an own random character, which depends on the transmitted data. Therefore, the overall sum of the nonlinear effects caused by the different optical signal powers also have a random character. Furthermore the overall sum of nonlinear effects is also strongly dependent on the respective random time-varying states of polarization of the multiple WDM channels.

In other words, the overall transmission distortions caused from cross-polarization and cross-phase modulation are not constant but vary over time and have an overall random character depending on the random character of the transmitted optical signals. Since the transmission distortions may cause bit errors of de-mapped data values, the overall random character of the transmission distortions determines the probability of a bit-error burst during an FEC block.

According to the proposed method, the transmitted optical signal possesses predetermined variations. This variation of the polarization state changes the random character of the optical signal, which in turn changes the overall random character of the transmission distortions. Therefore, the proposed variation of the polarization state lead to a modified probability of a bit-error burst. By this, a reduced number of bit errors during a FEC block may be achieved. The reduced number of bit errors may be smaller than the number of maximally correctable errors for the FEC block.

A further achievement is, that the proposed predetermined variation of the optical signal can be performed at a rate that may even be as high as the symbol rate. In order to appreciate this achievement, the filtering of the sampled signals on the receiving side before deriving data values from these filtered signals has to be considered in detail.

When a polarized signal propagates through a non-ideal optical fibre, the polarization state experiences a rotation from the transmission end to the receiving end due to temperature effects, mechanical stress effect or other effects. This rotation of the polarization state varies slowly in time and may be compensated at the receiving side, by sampling the optical field of the combined signal along two orthogonal polarization planes and filtering the respective sampled signals using a suitable equalization algorithm. This equalization algorithm needs a minimum amount of time corresponding to a minimum number of samples, before finally converging to a state in which it is able to determine the filter coefficients, such that the rotation of polarization states and/or other transmission distortions caused by the non-ideal optical fibre are compensated in an optimized way. This minimum amount of convergence time is significantly larger than the time duration of a single transmitted symbol value. Thus, if no further measures are taken on the receiving side, the minimum convergence time imposes a limitation on the variation rate of a predetermined variation of the polarization state caused on the transmission side.

But, if according to the proposed solution, a function that is indicative of the predetermined variation caused on the transmission side, is known on the receiving side and used for filtering the sampled signals, then the variation rate of the predetermined variation of the polarization states may exceed the minimum convergence time. Possibly, the variation rate of the predetermined variation of the polarization state may even be as high as the symbol rate.

In other words, knowing and using the function that is indicative of the predetermined variation allows the equalization algorithm to determine optimized filter coefficients for compensating the rotation of the polarization state caused by the optical fibre, even if the polarization state is varied on the transmission side at a variation rate, such that the polarization state changes during the minimum convergence time.

Varying the polarization state at a rate that may be even as high as the symbol rate allows a greater variation of the transmission distortions' overall random character. The occurring transmission distortions may thus be varied more freely during the transmission duration of a FEC block, which in turn allows to reduce the risk of a bit error burst on the receiving side. Therefore, the risk of receiving data values that form a FEC block with a number of uncorrectable errors may be reduced.

DESCRIPTION OF EMBODIMENTS

Figure 1:
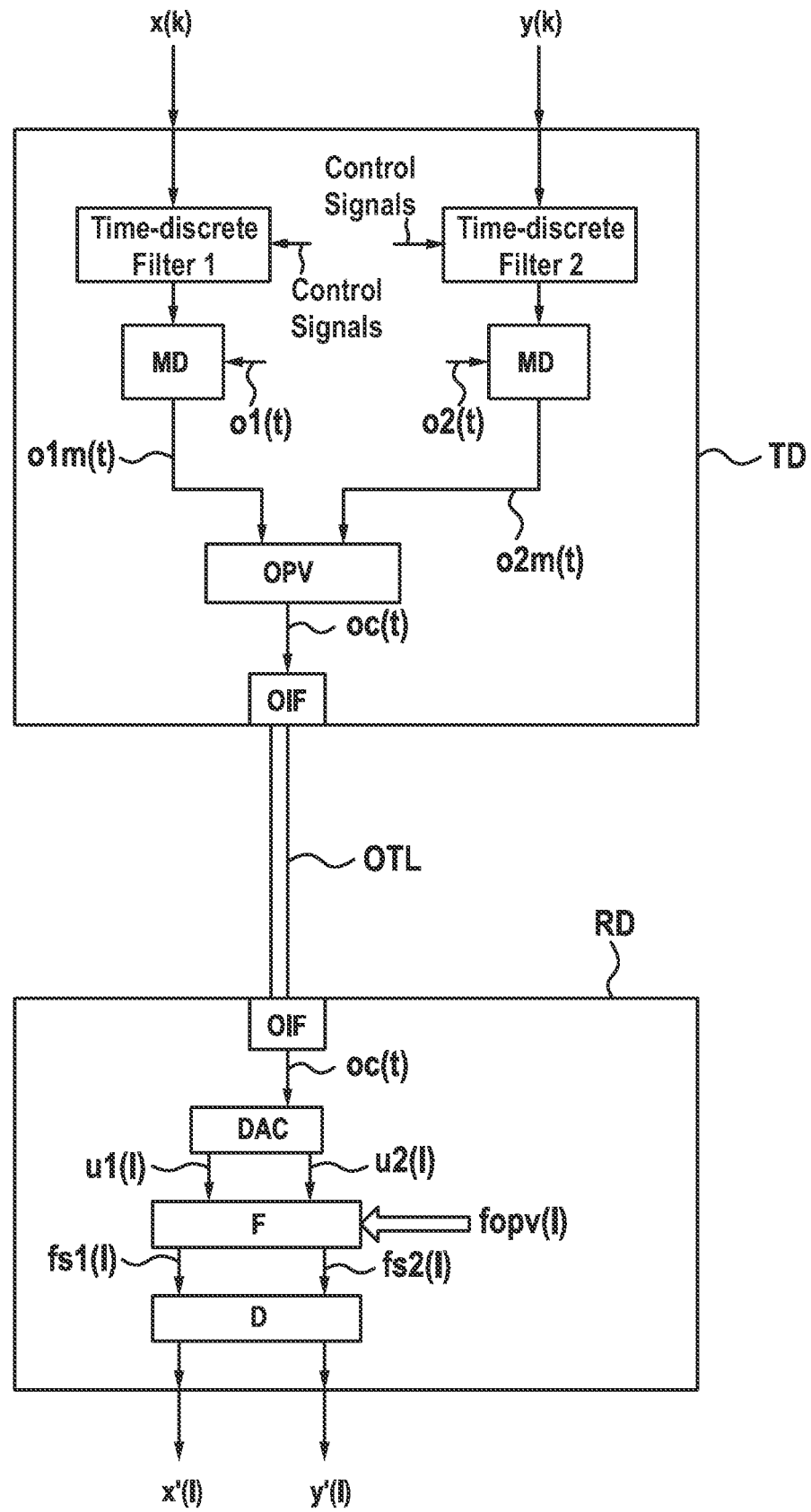
FIG. 1 shows an optical transmission device according to a first embodiment and an optical receiving device according to a first embodiment.

FIG. 1 shows an optical transmission device TD according to a first embodiment and an optical receiving device RD according to a first embodiment.

The transmission device TD generates an optical signal o1m(t) and an optical signal o2m(t), as it will now be explained in detail.

The transmission device TD receives data values x(k) and y(k). The transmission device TD contains a modulation device MD, for modulating the phase of an optical signal o1(t) in dependence on the data values x(k) and in accordance with a phase-shift keying method. Furthermore, the transmission device TD contains a modulation device MD, for modulating the phase of an optical signal o2(t) in dependence on the data values x(k) and in accordance with the phase-shift keying method.

The optical signals o1(t) and o2(t) are monochromatic optical signals that possess a same wavelength. Furthermore, the optical signals o1(t) and o2(t) possess respective polarization states, that are orthogonal to each other.

The signal resulting from the modulation of the optical signal o1(t) is the optical signal o1m(t). The signal resulting from the modulation of the optical signal o2(t) is the optical signal o2m(t).

A combined optical signal is generated, by combining the optical signals o1m(t), o2m(t), such that the combined optical signal oc(t) possesses a polarization state with a predetermined variation. The variation of the polarization state is chosen as a predetermined variation, which is controlled by the transmission device TD.

Preferably, the transmission device TD varies the polarization states in a predetermined manner, by controlling an optical device OPV, such as a Faraday Rotator or a Voltage-Controlled Waveplate, which acts on the combined optical signal ocm(t). This is described in detail with regard to the second embodiment. As an alternative solution, the transmission device TD varies the polarization states of the signals o1m(t) and o2m(t) in a predetermined manner, by controlling time-discrete filters, which filter the data values x(k) and y(k) or time-discrete values derived from the data values x(k) and y(k). The filtered data values x(k) and y(k) or the time-discrete values derived from the data values x(k) and y(k) are then used, for modulating the signals o1(t) and o2(t).

The combined optical signal oc(t) is transmitted over an optical transmission line OTL.

The optical receiving device RD receives the transmitted signals oc(t) at an optical interface OIF. A digital-analogue converter DAC generates two time-discrete sampled signals u1(l) and u2(l), by sampling the received optical signal oc(t along two orthogonal polarization planes. Preferably, the generation of the two time-discrete sampled signals u1(l) and u2(l) includes a phase-coherent hybrid mixing of the received optical signal oc(t) with a carrier signal cs(t), for shifting the received optical signal oc(t) in the frequency domain. Then, the frequency shifted optical signal oc(t) is sampled along two orthogonal polarization planes. This has the advantage, that the sampling rate, at which the frequency shifted optical signal is sampled, can be chosen to a smaller rate, than when directly sampling the optical signals o1mpv(t) and o2mpv(t). The carrier signals cs(t) is preferably a continuous-wave optical signal with a wavelength that is essentially equal to that of the optical signal oc(t).

A time-discrete filtering unit F, such as a digital-signal processor or a programmed Field Programmable Gate Array carrying out a signal processing algorithm, generates filtered signals fs1(l) and fs2(l), by filtering the time-discrete sampled signals u1(l) and u2(l). For this filtering, the filtering unit F uses a function fopv(l), which indicates the predetermined variations of the polarization states of the signals o1mpv(t) and o2mpv(t) caused at the transmission device TD. Using this time-discrete function fopv(l), the filtering unit F of the device RD is able to essentially compensate the predetermined variation of the polarization state caused at the transmission device TD. The function fopv(l) is a predetermined function. Furthermore, the function fopv(l) is a deterministic function, describing the predetermined variation of the polarization state caused at the transmission device TD.

The step of filtering carried out by the filtering unit F preferably includes time-discrete filtering the sampled signals u1(l) and u2(l) using an equalization algorithm, for compensating linear transmission distortions caused by non-ideal optical fibers in an optimized manner. An example of such a transmission distortion is a rotation of polarization states caused by the non-ideal optical fibre.

A derivation unit D, which may be a digital-signal processor or a programmed Field Programmable Gate Array carrying out a signal processing algorithm, derives estimated data values x'(k) from the filtered signal fs1(l) and estimated data values y'(k) from the filtered signal fs2(l).

The filtering unit F and the derivation unit D may be provided as separate devices, or alternatively as one integral device.

The signals o1(t) and o2(t) are monochromatic in the sense, that they have a minimized bandwidth, such that they can be regarded as possessing a single wavelength.

The proposed method may achieve one or more of the following advantages, which have been described in detail previously, and can be summarized as follows:
- the predetermined variation of the polarization state changes the random character of the optical signals, which in turn changes the overall random character of the transmission distortions; therefore, the proposed predetermined variation of the polarization state leads to a modified probability of a bit-error burst, by which a reduced number of bit errors during a FEC block may be achieved; the reduced number of bit errors may be smaller than the number of maximally correctable errors for the FEC block.
- since the function fopv(l), which is indicative of the predetermined variation caused on the transmission side, is known on the receiving side and used for filtering the sampled signals, the variation rate of the predetermined variation of the polarization state may exceed the minimum convergence time of the equalization algorithm; this allows to affect the overall random character of the transmission distortions to a greater degree of freedom, which in turn allows to reduce the risk of a bit error burst on the receiving side.

Figure 2:
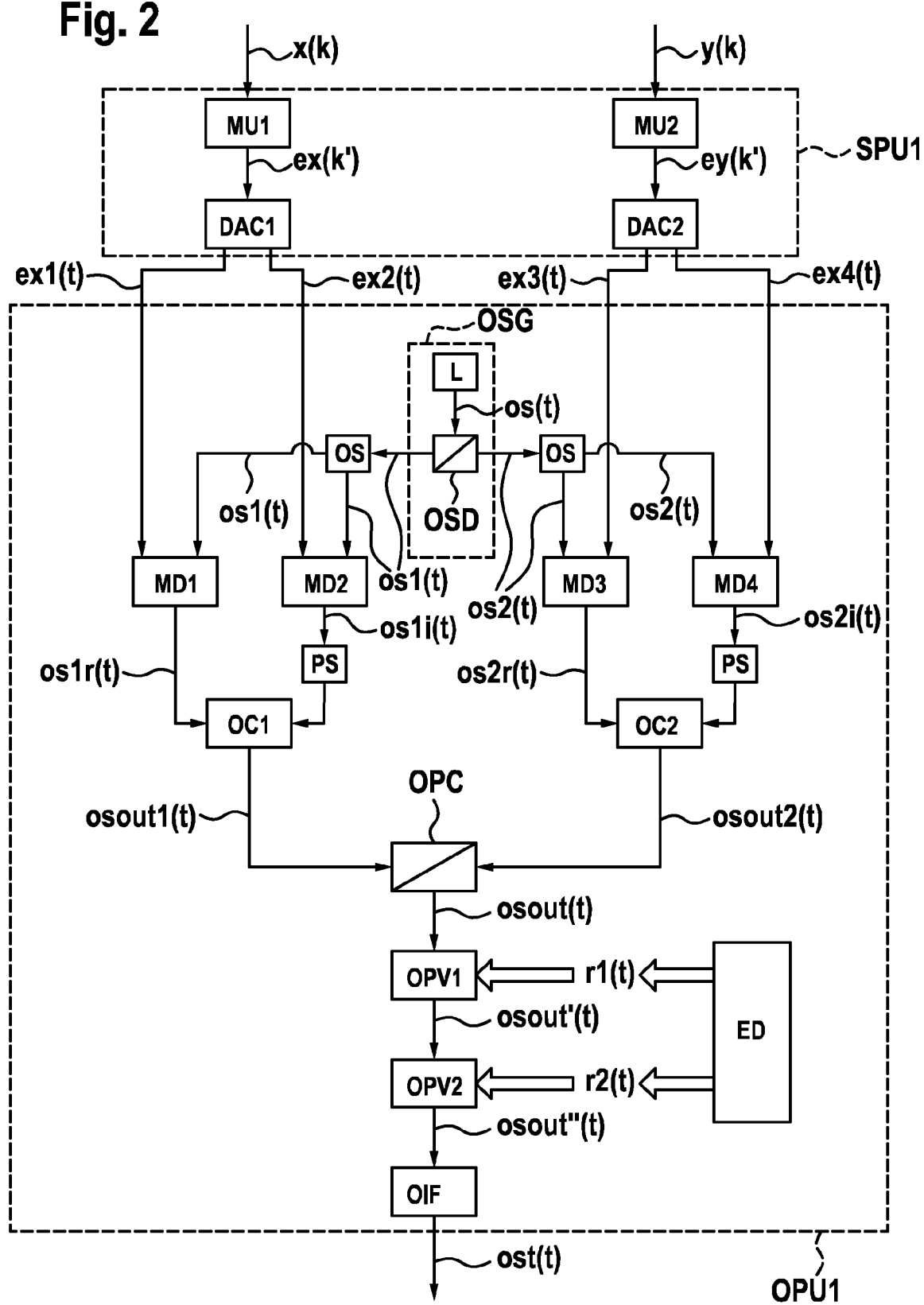
FIG. 2 shows the optical transmission device according to a second embodiment in more detail.

FIG. 2 shows the optical transmission device according to a second embodiment TD1, which is now described in detail. The device TD1 receives data values x(k) and data values y(k). The data values x(k) and y(k) are preferably data bits, which are provided by at least one FEC encoding unit not shown in FIG. 2. The FEC encoding unit may be an integral part of the device TD1 or a part of a separate device, to which the device TD1 is connected via at least one data interface. The data values x(k) and y(k) are time-discrete FEC encoded data bits and have a time-discrete index k.

The data values x(k) and y(k) are received at the transmission device TD1 at a data rate $f_{DR}$. A sequence of N consecutive data values x(k) form a FEC block that has a block rate $f_B$ of $$f_B = f_{DR}/N.$$

The device TD1 contains at least one signal processing unit SPU1. The signal processing unit SPU1 contains at least one mapping unit MU1, MU2 and at least one digital-analogue converter DAC1, DAC2.

A mapping unit MU1 generates symbol values ex(k'), by mapping the data values x(k) onto constellation points of a PSK modulation scheme. The mapping unit MU2 generates symbol values ey(k'), by mapping the data values y(k) onto constellation points of the phase-shift keying modulation scheme. The symbol values ex(k') and ey(k') are time-discrete values with a time-discrete index k'.

Mapping is performed, by taking a set of M consecutive data values x(k) and choosing as the symbol value ex(k') that constellation point of the PSK modulation scheme, which represents this set of M data values. The same mapping is performed, for generating the symbol values ey(k') from the data values y(k). The symbol values ex(k') and ey(k') have a symbol rate $f_{SYM}$ of $$f_{SYM} = f_{DR}/M.$$

In this application, the meaning of a PSK modulation method includes methods, in which the phase and/or the amplitude of a signal is modulated in dependence on transmitted data values. Examples of a modulation method in which only the phase of a signal is modulated are the BSPK or the QPSK modulation method. An example of a PSK modulation method in which the phase and the amplitude of a signal are modulated is the Quadrature-Amplitude Modulation (QAM) method.

In the case, that the modulation method of BPSK is used, then the symbol values ex(k') and ey(k') are time-discrete real values, preferably with possible values of −1 or +1. In the case, that a modulation method such as QPSK is used, then the symbol values ex(k') and ey(k') are time-discrete complex values, preferably with possible values of $$+\sqrt{2}+i\sqrt{2},$$

$$+\sqrt{2}-i\sqrt{2},$$

$$-\sqrt{2}+i\sqrt{2},$$

$$-\sqrt{2}-i\sqrt{2},$$

wherein $i = \sqrt{-1}$.

A real part Re{ex(k')}, Re{ey(k')} of a symbol value ex(k'), ey(k') represents the amplitude of a cosine-signal possessing a specific transmission frequency and a phase shift of zero, while an imaginary part Im{ex(k')}, Im{ey(k')} of a symbol value ex(k'), ey(k') represents a sinusoidal-signal signal possessing the same specific transmission frequency and a phase shift of zero. A phase modulation of an actual transmission signal possessing the transmission frequency in dependence on symbol values ex(k') may be carried out, by generating a cosine-signal possessing the transmission frequency, a phase-shift of zero and an amplitude proportional to the real part Re{ex(k')}, generating a sinusoidal-signal possessing the transmission frequency, a phase shift of zero and an amplitude proportional to the imaginary part Im{ex(k')}, and finally superposing the generated cosine-signal and the generated sinusoidal signal for obtaining the phase-modulated transmission signal.

How this principle is used in the proposed transmission device TD1 is now explained in detail.

The symbol values ex(k') are passed on from the mapping unit MU1 to a digital-analogue converter DAC1 of the processing unit SPU1. The converter DAC1 determines the real part Re{ex(k')} of the symbol value ex(k'), and generates a time-continuous electrical signal ex1(t) that has an amplitude proportional to the determined real part Re{ex(k')}. Furthermore, in the case that the symbol value ex(k') is a complex value, then the converter DAC1 determines also the imaginary part Im{ex(k')} of the symbol value ex(k'), and generates a time-continuous electrical signal ex2(t) that has an amplitude proportional to the determined imaginary part Im{ex(k')}. The index t of the signals ex1(t), ex2(t) denotes the continuous time. The electrical signals ex1(t) and ex2(t) have a frequency $f_E$, which lies preferably within the range of several Gigaherz (GHz).

The electrical signals ex1(t) and ex2(t) are passed on from the signal processing unit SPU1 to an optical processing unit OPU1. The optical processing unit OPU1 contains at least two frequency generators FG1, FG2, FG3, FG4, at least one optical signal generator OSG, at least two modulation devices MD1, MD2, MD3, MD4, at least one optical polarization combiner OPC, at least one optical polarization variator OPV1, OPV2 and at least one optical interface OIF.

At the optical processing unit OPU1, the signal ex1hf(t) is passed on to a modulation device MD1, while the signal ex2(t) is passed on to a modulation device MD2. The modulation devices MD1 and MD2 are preferably Mach-Zehnder Modulators.

The optical processing unit OPU1 contains an optical signal generator OSG, which contains a laser L. The laser L generates a monochromatic optical signal os(t). The signal os(t) possesses a frequency $f_O$, which lies preferably within the range of several Terahertz (THz). The signal os(t) is an optical signal that is linearly polarized and thus possesses a linear polarization state. For generating a linearly polarized optical signal, the optical signal generator OSG may contain a linear polarization filter that is coupled to the laser L. The signal os(t) is passed from the laser L to an optical splitting device OSD contained in the optical signal generator OSG. The splitting device OSD splits the optical signal os(t) into two optical signals os1(t) and os2(t), such that the linear polarization state of the signal os1(t) is essentially orthogonal to the linear polarization state of the signals os2(t). The signal os1(t) is provided by the optical signal generator OSG to an optical splitter OS, which provides the signal os1(t) to modulation devices MD1 and MD2. The signal os2(t) is provided by the optical signal generator OSG to an optical splitter OS, which provides the signal os2(t) to modulation devices MD3 and MD4.

The modulation device MD1 generates an optical signal os1r(t), by modulating the amplitude of the optical signal os1(t) in dependence on the amplitude of the electrical signal ex1hf(t). The modulation device MD2 generates an optical signal os1i(t), by modulating the amplitude of the optical signal os2(t) in dependence on the amplitude of the electrical signal ex2hf(t). The phase of the signal os1i(t) is shifted by a phase shift of π/2 using a phase shifter PS1, which is equivalent to changing a cosine-signal to a sinusoidal signal. The signals os1r(t) and os1i(t) are then combined to an optical signal osout1(t) by an optical combiner OC1. The signal os1r(t) represents the real part of the signal osout1(t), while the signal os1i(t) represents the imaginary part of the signal osout1(t).

To summarize the above: the symbol values ex(k') are used, to generate an electrical signal ex1(t), whose amplitude is proportional to the real part Re{ex(k')} of the symbol values ex(k'). Then, the amplitude of the monochromatic optical signal os1(t) is modulated by the signal ex1(t), which leads to the monochromatic optical signal os1r(t). Thus, the signal os1r(t) represents the real part of the phase-modulated signal osout1(t). Furthermore, the symbol values ex(k') are used, to generate an electrical signal ex2(t), whose amplitude is proportional to the imaginary part Im{ex(k')} of the symbol value ex(k'). Then, the amplitude of the monochromatic optical signal os1(t) is modulated by the signal ex2(t), which leads to the monochromatic optical signal os1i(t). Thus, the signal os1i(t) represents the imaginary part of the phase-modulated signal osout1(t).

It has been explained above in detail, in which way the data values x(k) are used to generate the symbol values ex(k'), and in which further way the phase of the optical signal os1(t) is modulated in dependence on the symbol values ex(k'), to obtain the phase-modulated signal osout1(t). Since the symbol values ex(k') are generated using the data values x(k), the optical signal os1(t) is also modulated in dependence on the data values x(k). In a similar way, the data values y(k) are used to generate symbol values ey(k') and to modulate the optical signal os1(t) in dependence on the symbol values ey(k'), to obtain a phase-modulated signal osout2(t), as shown in FIG. 2. The symbol values ey(k') are generated using the data values y(k), therefore the optical signal os2(t) is modulated in dependence on the data values y(k).

The signals osout1(t) and osout2(t) are combined to a combined optical signal osout(t) by an optical polarization combiner OPC, such that their polarization states are preserved. Thus, the combined signal osout(t) consists of two signal components osout1(t) and osout2(t), whose polarization states are orthogonal to each other.

A time-dependent function r1(t) is provided at the device TD1. The function r1(t) is a predetermined time-dependent signal. The linear polarization states of the signal osout(t) is varied in dependence on this predetermined, deterministic function r1(t). The variation of the polarization state is a predetermined variations. The result of this polarization variation is a combined signal osout'(t). Varying a polarization state of an optical signal can be described using a so called Jones Matrix. A possible mathematical description of this is now given in detail.

For example, the signal component osout1(t) is a signal with a linear polarization state. Thus, when referring to a Cartesian coordinate system, the signal osout1(t) can be described as an electro-magnetic wave with an electrical field $E_X(t)$, that lies exclusively within the x-plane. Furthermore, the signal component osout2(t) can be described as an electro-magnetic wave with an electrical field $E_Y(t)$, that lies exclusively within the y-plane. As an example of a proposed variation of polarization states, a rotation of the linear polarization state of the combined signals osout(t) is carried out, such that the polarization states of the signal components osout1(t) and osout2(t) remain orthogonal to each other. In other words, the polarization planes of the signal components osout1(t) and osout2(t) are rotated by a same angle. Furthermore, the polarization state of the combined signal osout(t) is varied, such that the signal energies of the signals osout1(t) and osout2(t) are preserved.

The resulting signal components $\hat{E}_X(t)$ and $\hat{E}_Y(t)$ of the resulting signal osout'(t) can be described by the equation $$\begin{bmatrix} \hat{E}_X(t) \\ \hat{E}_Y(t) \end{bmatrix} = U \cdot \begin{bmatrix} E_X(t) \\ E_Y(t) \end{bmatrix} = \begin{bmatrix} u_{XX} & u_{YX} \\ u_{XY} & u_{YY} \end{bmatrix} \cdot \begin{bmatrix} E_X(t) \\ E_Y(t) \end{bmatrix},$$

wherein U is the signal transformation matrix that is called the Jones matrix with $$U = \begin{bmatrix} u_{XX} & u_{YX} \\ u_{XY} & u_{YY} \end{bmatrix}.$$

Herein, the coefficient $u_{XX}$ determines the contribution of the wave $E_X(t)$ to the wave $\hat{E}_X(t)$, $u_{YX}$ determines the contribution of the wave $E_Y(t)$ to the wave $\hat{E}_X(t)$, $u_{XY}$ determines the contribution of the wave $E_X(t)$ to the wave $\hat{E}_Y(t)$, and $u_{YY}$ determines the contribution of the wave $E_Y(t)$ to the wave $\hat{E}_Y(t)$.

In order to ensure, that the polarization states of the signal components osout1(t) and osout2(t) remain orthogonal to each other, and to ensure that the signal energies are preserved, the signal transformation matrix U is chosen as a unitary matrix. Thus, the predetermined variation of the polarization state of the combined signal osout(t) can be described by a signal transformation of the combined electromagnetic field using a unitary signal transformation matrix.

In this second embodiment described with respect to FIG. 2, the polarization state of the combined signal is varied, using at least one optical polarization variator OPV1. The combined input signal osout(t), with signal components osout1(t) and osout2(t), is provided to the optical polarization variator OPV1, which generates the optical signal osout'(t).

The optical polarization variator OPV1 is preferably a Faraday Rotator FR. A Faraday Rotator consists of an optical fiber, that rotates the polarization state of an optical signal by an angle α. The angle α depends linearly on a magnetic field B that surrounds the optical fiber. When wrapping a metal coil around the fiber and sending an electrical current I(t) through the coil, then the magnetic field B surrounding the optical fiber is a linear function of the current I(t). Thus, when choosing the current I(t) as a predetermined, deterministic function, also the angle α is a time-dependent linear predetermined function of the current I(t). The exact predetermined function describing the dependency of α(t) on the current I(t) can be easily determined, knowing the dimensioning of the coil, the optical fiber and the so-called Verdet Constant of the optical fiber.

The signal transformation of polarization states caused by the Faraday Rotator FR can be described by the matrix $$U_{FR} = \begin{bmatrix} \cos(\alpha) & -\sin(\alpha) \\ \sin(\alpha) & \cos(\alpha) \end{bmatrix}.$$

Thus, by choosing the current I(t), which controls the Faraday Rotator, as the predetermined time-dependent function r1(t)=I(t), the polarization states of the signals os1out(t) and os2out(t) are varied in dependence on the function r1(t) in a predetermined way. The angle α(t) is a direct predetermined function of the predetermined function r1(t) as $$\alpha(t)=f(r1(t)),$$

and furthermore the signal transformation matrix $U_{FR}$ is a direct predetermined function of r1(t) as $$U_{FR}(t) = \begin{bmatrix} \cos(\alpha(t)) & -\sin(\alpha(t)) \\ \sin(\alpha(t)) & \cos(\alpha(t)) \end{bmatrix} = f(r1(t)).$$

The signal transformation matrix $U_{FR}$ of the Faraday Rotator contains only real values. Thus, the variation of the linear polarization state of the signals osout(t) can be interpreted as a rotation of its polarization states by an angle α. This is equivalent to changing the representation of the polarization states on the Poincaré Sphere described in polar coordinates $\{r,\theta,\phi\}$ by an angle $\Delta\theta=\alpha$.

The rate $f_{r1}$, at which the time-dependent function r1(t) is varied, determines the rate at which the polarization state of the signal osout(t) is varied. Preferably, the time-dependent function r1(t) is varied at a rate $f_{r1}$ that is greater than the FEC block rate $f_B$. Preferably, the time-dependent function r1(t) is varied at a rate $f_{r1}$ that lies within a range delimited by the FEC blocks rate $f_B$ and the symbol rate $f_{SYM}$ as $$f_B < f_{r1} \leq f_{SYM},$$

which results in a variation of the polarization state of the signals osout(t) at this rate $f_{r1}$. A variation of the polarization state at a rate $f_{r1}$ with a value that may be even as high as the symbol rate $f_{SYM}$ is made possible, since according to the proposed method, a receiving side is provided with the time-dependent function r1(t) and the dependency $U_{FR}$ between the function r1(t) and the polarization state for deriving estimates of the optical signal osout(t) from a received optical signal. This derivation is described further below with reference to the proposed embodiment of a receiving device.

If it is desired to vary the polarization state of the combined optical signal osout(t), such that the representation of the polarization state on the PoincaréSphere is changed also by an angle $\Delta\phi$, then a corresponding signal transformation matrix U has to contain complex elements. In order to achieve this, the signal osout'(t) is provided to a Voltage Controlled Waveplate VCW, which generates an output signal osout"(t).

A Voltage Controlled Waveplate VCW is an optical element consisting of a crystal medium that is exposed to an electrical field E. The electrical field E may be caused by a capacitor that surrounds the crystal medium. Within the crystal medium, the Pockels Effect occurs, which is a linear electro-optical effect causing a modulation of the optical refractive index in one direction of the crystal. The modulation of the optical refractive index depends linearly on the electrical field E to which the crystal medium is exposed. The modulation of the optical refractive index in the mentioned direction causes a linear phase shift $\Delta\phi$ between an optical signal component lying on an axis that is equal to the mentioned direction and another signal component lying on an axis that is orthogonal to the mentioned direction. The phase shift $\Delta\phi$ depends linearly on the electrical field E, and thus also depends linearly on an electrical voltage V acting on the capacitor.

The resulting signal transformation matrix $U_{VCW}$ describing the effect of the Voltage Controlled Waveplate VCW onto an electro-magnetic wave with an electrical field component $E_X(t)$ lying on the x-plane and another electrical field component $E_Y(t)$ lying on the y-plane can be given by $$U_{VCW} = \begin{bmatrix} \exp(-j \cdot \Delta\varphi) & 0 \\ 0 & \exp(j \cdot \Delta\varphi) \end{bmatrix}.$$

This is equivalent to changing the representation of the polarization states of the signal components on the Poincaré-Sphere described in polar coordinates $\{r,\theta,\phi\}$ by an angle $\Delta\phi$.

As stated previously above, the angle $\Delta\phi$ depends linearly on the electrical voltage V acting on the capacitor of the Voltage Controlled Waveplate VCW. Thus, by choosing as a provided predetermined time-dependent function r2(t) the electrical voltage V as V(t)=r2(t), the polarization state of the optical signal passing through the Voltage Controlled Waveplate VCW is varied in a predetermined manner in dependence on the provided time-dependent function r2(t). Therefore, the polarization state of the optical signal osout(t) is varied in a predetermined manner in dependence on the provided time-dependent function r2(t). The exact linear predetermined dependency between the electrical voltage V(t) and the angle $\Delta\phi(t)$ depends on the dimensioning of the Voltage Controlled Waveplate VCW and can easily be determined by a person skilled in the art of optical elements.

The overall predetermined variation of the polarization state of the optical signal caused by the faraday rotator FR and the Voltage Controlled Waveplate VCW can be described by an overall signal transformation matrix $U_O$ as $$U_O = U_{FR} \cdot U_{VCW}$$
$$= \begin{bmatrix} \cos(\alpha(t)) \cdot \exp(-j \cdot \Delta\varphi(t)) & -\sin(\alpha(t)) \cdot \exp(j \cdot \Delta\varphi(t)) \\ \sin(\alpha(t)) \cdot \exp(-j \cdot \Delta\varphi(t)) & \cos(\alpha(t)) \cdot \exp(j \cdot \Delta\varphi(t)) \end{bmatrix},$$

which allows a predetermined variation of the polarization state over the whole Poincarésphere using the provided functions r1(t) and r2(t).

Preferably, the time-dependent function r2(t) is varied at a rate $f_{r2}$ that is greater than the FEC blocks rate $f_B$. Preferably, the time-dependent function r2(t) is varied at a rate $f_{r2}$, that lies within a range delimited by the FEC blocks rate $f_B$ and the symbol rate $f_{SYM}$ as $f_B < f_{r2} \leq f_{SYM}$.

In the embodiment described with regard to FIG. 2, two devices FR, VCW are used for varying the polarization state over the Poincarésphere in a predetermined manner in dependence on the provided functions r1(t) and r2(t). As an alternative solution, only one device FR may by used for varying the polarization state over the Poincarésphere in dependence on only one provided function r1(t). In other words, the polarization state is varied in dependence on at least one provided predetermined deterministic time-dependent function r1(t), r2(t).

The output signal osout"(t) is provided by the Voltage Controlled Waveplate VCW to an optical interface OIF. The optical interface OIF is connectable to an optical fiber, for transmitting the output signal osout"(t) as a transmission signal ost(t) into the optical fiber.

In this second embodiment, the predetermined deterministic time-dependent time-continuous functions r1(t) and r2(t) are provided as electrical signals in the form of an electrical current r1(t)=I(t) and as an electrical voltage r2(t)=V(t) by an electrical device ED to the optical polarization variators OPV1, OPV2. The electrical device ED is contained within the transmission device TD1, and is preferably also an integral part of the optical processing unit OPU1. In other words, in this second embodiment the electrical device ED is a provisioning device that provides at least one time-dependent function r1(t), r2(t).

In this second embodiment of the transmission device TD1, the predetermined variation of the polarization state is carried out in the optical domain, by an optical signal modification of the combined optical signal osout(t), which contains the optical signal components osout1(t) and osout2(t). This is done, using optical polarization variators OPV1, OPV2.

In the above described embodiment, the transmission device TD1 contains four frequency generators FG1, FG2, FG3, FG4, four modulation devices MD1, MD2, MD3, MD4 and two phase shifters PS1, PS2 for allowing processing of two complex symbol value streams ex(k') and ey(k') when using a modulation scheme such as QPSK. In the case, that BPSK is used as a modulation scheme, then the symbol values ex(k'), ey(k') may be real valued only without an imaginary component. In this case, the frequency generators FG2 and FG4, the modulation devices MD2 and MD4 as well as the phase shifters PS1 and PS2 may be obsolete and thus not contained in the transmission device TD1.

In the above described embodiment, the transmission device TD1 contains two separate mapping units MU1 and MU2. As an alternative solution, the two mapping unit MU1 and MU2 may be provided as one single mapping unit.

In the above described embodiment, the transmission device TD1 contains two digital-analogue converters DAC1 and DAC2. As an alternative solution, the two digital-analogue converters DAC1 and DAC2 may be provided as one single digital-analogue converter.

In the above described embodiment, the optical signals os1(t) and os2(t) are provided by the optical signal generator OSG as signals that possess polarization states which are essentially orthogonal to each other. Later on, the signals osout1(t) and osout2(t) are derived from the signals os1(t) and os2(t) with respective polarization states. Then, the signals osout1(t) and osout2(t) are combined to the signal osout(t) by the combiner OPC, such that the orthogonality of the polarization states is preserved. As an alternative solution, the optical signals os1(t) and os2(t) may be provided by the optical signal generator OSG as signals that possess same polarization states, while the signals osout1(t) and osout2(t) are combined to the signal osout(t) by the combiner OPC including a rotation of their respective polarization states, such that their polarization states are essentially orthogonal to each other.

In the above described embodiment of a transmission device TD1, the signals os1(t) and os2(t) are optical signals possessing respective linear polarization states that are essentially orthogonal to each other, for carrying out data transmission using PDM. The above described embodiment is not limited to linear polarization states. Alternatively, the signals os1(t) and os2(t) are optical signals possessing respective circular polarization states that are essentially orthogonal to each other. As an even further alternative, the signals os1(t) and os2(t) are optical signals possessing respective elliptical polarization states that are essentially orthogonal to each other. The above described principles of polarization variation can be applied not only to signals possessing linear orthogonal polarization states, but also to signals possessing circular or elliptical orthogonal polarization states.

The above described embodiment of a transmission device TD1 performs data transmission including PDM, by generating at least two optical signals osout1(t) and osout2(t) with respective orthogonal polarization states and respective same wavelengths, for transmitting respective data values x(k) and y(k). As an alternative solution, the transmission device TD1 may be extended to perform data transmission including PDM and WDM. In such an alternative solution, the transmission device TD1 is extended, such that it generates furthermore at least two further optical signals, which possess respective orthogonal polarization states and respective same wavelengths differing from the wavelengths of the signals osout1(t) and osout2(t), for transmitting respective data values.

In the above described embodiment, the phase of the optical signal os1(t) is modulated in dependence on the symbol values ex(k') and thus also in dependence on the data values x(k), while the phase of the optical signal os2(t) is modulated in dependence on the symbol values ey(k') and thus also in dependence on the data values y(k).

Figure 3:
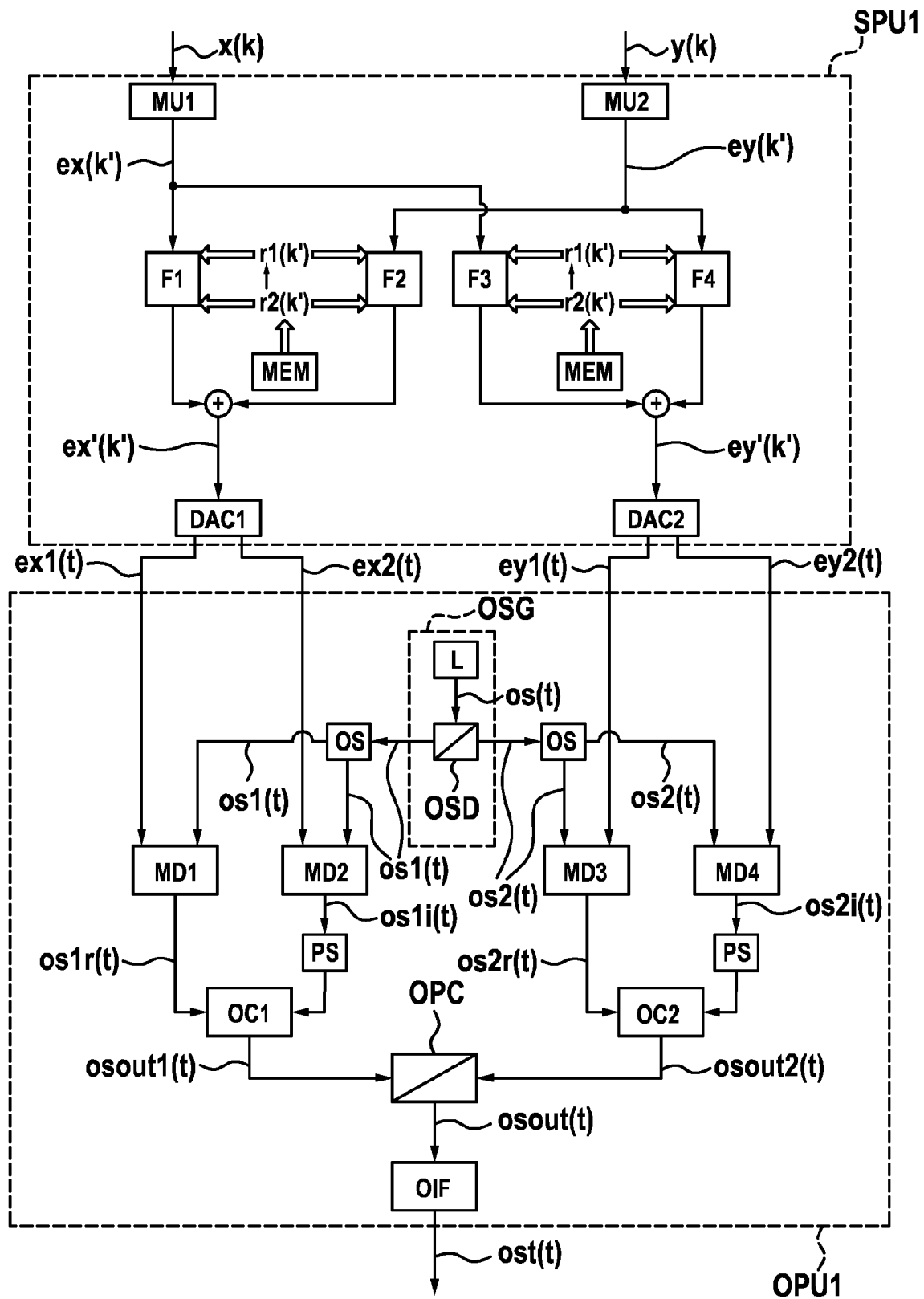
FIG. 3 shows the optical transmission device according to a third embodiment in more detail.

FIG. 3 shows the proposed transmission device according to a third embodiment TD2, which contains a signal processing unit SPU2 and an optical processing unit OPU2. In general, the same principles as described with regard to the second embodiment off the transmission device TD1 apply to the third embodiment of the transmission device TD2 shown in FIG. 3. In the second embodiment, a predetermined variation of the polarization state of the combined optical signal osout(t) is carried out in the optical domain, by optical polarization variators OPV1, OPV2 acting on the optical signals. The third embodiment of the transmission device TD2 shown in FIG. 3 differs from this, in that the polarization states of the optical signals osout1(t) and osout2(t) are varied using time-discrete filters F1, F2, F3, F4 acting on the symbol values ex(k') and ey(k') in the time-discrete electrical signal domain. Thus, the third embodiment of the transmission device TD2 contains time-discrete filters F1, F2, F3, F4 as an alternative to the optical polarization variators OPV1, OPV2. The combined optical signal osout(t) is transmitted as the transmission signal ost(t) at the optical interface OIF into an optical transmission fiber.

In other words, in the third embodiment a predetermined variation of the polarization state of the combined optical signal osout(t) is carried out, by a predetermined variation of the polarization states of the signal components osout(1), osout2(t) in the time-discrete signal domain in dependence on a time-dependent function, by a time-discrete filtering of the symbol values generated from the received data values.

The signal processing unit SPU1 contains at least one mapping unit MU1, MU2, at least four time-discrete filtering elements F1, F2, F3, F4 and at least one digital-analogue converter DAC1, DAC2.

The optical processing unit OPU2 contains at least two frequency generators FG1, FG2, FG3, FG4, at least one optical signal generator OSG, at least two modulation devices MD1, MD2, MD3, MD4, at least one optical polarization combiner OPC and at least one optical interface OIF.

As it has been outlined with respect to the second embodiment shown in FIG. 2, a variation of a polarization state can be described by a signal transformation matrix $$U = \begin{bmatrix} u_{XX} & u_{YX} \\ u_{XY} & u_{YY} \end{bmatrix}$$

acting on the electrical field components $E_X(t)$ and $E_Y(t)$ representing the optical signal components osout1(t) and osout2(t), which leads to electrical field components $\hat{E}_X(t)$ and $\hat{E}_Y(t)$ of the resulting signal osout'(t) as $$\begin{bmatrix} \hat{E}_X(t) \\ \hat{E}_Y(t) \end{bmatrix} = U \cdot \begin{bmatrix} E_X(t) \\ E_Y(t) \end{bmatrix} = \begin{bmatrix} u_{XX} & u_{YX} \\ u_{XY} & u_{YY} \end{bmatrix} \cdot \begin{bmatrix} E_X(t) \\ E_Y(t) \end{bmatrix}.$$

Since the electrical field component $E_X(t)$ representing the optical signal component osout1(t) depends linearly on the symbol value ex(k'), and since the electrical field component $E_Y(t)$ representing the optical signal component osout2(t) depends linearly on the symbol value ey(k'), a same predetermined variation of the polarization state of the combined optical signal osout(t) can be achieved, by a transformation of the symbol values ex(k') and ey(k') in dependence on a time-discrete representation of the signal transformation matrix U.

This variation is carried out by the filters time-discrete filters F1, F2, F3, F4 acting on the symbol values ex(k') and ey(k') in the time-discrete signal domain. The filters F1, F2, F3, F4 are preferably finite-impulse response filters of tap-length K, with i=1, ..., K being the tap index. The filters F1, F2, F3, F4 have for an arbitrarily chosen but fixed tap index i=1, ..., K respective filter coefficients $h_1(k')$, $h_2(k')$, $h_3(k')$, $h_4(k')$. Preferably, the remaining other filter coefficients of the filters F1, F2, F3, F4 with a different tap index are chosen to the value zero.

Using the provided input symbol values ex(k') and ey(k'), the filters F1, F2, F3, F4 generate modified symbol values ex'(k') and ey'(k') at the symbol rate $f_{SYM}$. This can be described by a transformation as $$\begin{bmatrix} ex'(k') \\ ey'(k') \end{bmatrix} = \begin{bmatrix} h_1(k') & h_2(k') \\ h_3(k') & h_4(k') \end{bmatrix} \cdot \begin{bmatrix} ex(k') \\ ey(k') \end{bmatrix} = U_{TD} \cdot \begin{bmatrix} ex(k') \\ ey(k') \end{bmatrix},$$

wherein $U_{TD}$ is the corresponding transformation matrix depending on the filter coefficients $h_1(k'), h_2(k'), h_3(k'), h_4(k')$.

By choosing the filter coefficients as $h_1(k') = \cos(\alpha(k'))$, $h_2(k') = -\sin(\alpha(k'))$, $h_3(k') = \sin(\alpha(k'))$, $h_4(k') = \cos(\alpha(k'))$, and setting the provided time-dependent function r1(t) as a time-discrete function r1(k')=α(k') with a sampling rate equal to the symbol rate $f_{SYM}$, one yields a transformation matrix $U_{TD}$ as $$U_{TD}(k') = \begin{bmatrix} h_1(k') & h_2(k') \\ h_3(k') & h_4(k') \end{bmatrix} = \begin{bmatrix} \cos(\alpha(k')) & -\sin(\alpha(k')) \\ \sin(\alpha(k')) & \cos(\alpha(k')) \end{bmatrix}.$$

This transformation matrix $U_{TD}$ causes a same variation of the polarization states as the transformation matrix $U_{FR}$ of the Faraday Rotator of the embodiment depicted in FIG. 2. Thus, the polarization state of the combined optical signal osout(t) is varied in dependence on the provided time-dependent function r1(k')=α(k').

The rate $f'_{r1}$, at which the time-dependent function r1(k') is varied, determines the rate at which the polarization state of the signals osout(t) is varied. Preferably, the predetermined deterministic time-dependent function r1(k') is varied at a rate $f'_{r1}$ that is greater than the FEC blocks rate $f_B$. Preferably, the time-dependent function r1(k') is varied at a rate $f'_{r1}$, that lies within a range delimited by the FEC blocks rate $f_B$ and the symbol rate $f_{SYM}$ as $$f_B < f'_{r1} \leq f_{SYM},$$

which results in a variation of the polarization state of the signal osout(t) at this rate $f'_{r1}$. A variation of the polarization state at a rate $f'_{r1}$ with a value that may be even as high as the symbol rate $f_{SYM}$ is made possible, since according to the proposed method, a receiving side is provided with the time-dependent function r1(k') and the dependency $U_{TD}$ between the function r1(k') and the polarization state for deriving estimates of the optical signal osout(t) from a received optical signal. This is described further below with reference to the proposed embodiment of a receiving device.

In the second embodiment shown in FIG. 2, a predetermined variation of the polarization state of the signal osout(t) was also proposed using a combination of a Faraday Rotator and a Voltage Controlled Waveplate. As it has been explained in detail in the second embodiment, such a variation of polarization states can be described by an overall transformation matrix $U_{TDO}$ as $$U_{TDO} = \begin{bmatrix} \cos(\alpha) \cdot \exp(-j \cdot \Delta\varphi) & -\sin(\alpha(t)) \cdot \exp(j \cdot \Delta\varphi) \\ \sin(\alpha) \cdot \exp(-j \cdot \Delta\varphi) & \cos(\alpha(t)) \cdot \exp(j \cdot \Delta\varphi) \end{bmatrix}.$$

In order to achieve a same rotation of the polarization state of the signals osout(t), the filter coefficients $h_1(k')$, $h_2(k')$, $h_3(k')$, $h_4(k')$ of the filters F1, F2, F3, F4 are chosen as $h_1(k')=\cos(\alpha(k')) \cdot \exp(-j \cdot \Delta\phi(k'))$, $h_2(k')=-\sin(\alpha(k')) \cdot \exp(-j \cdot \Delta\phi(k'))$, $h_3(k')=\sin(\alpha(k')) \cdot \exp(j \cdot \Delta\phi(k'))$, $h_4(k')=\cos(\alpha(k')) \cdot \exp(j \cdot \Delta\phi(k'))$, while setting the provided time-dependent function r1(t) to r1(k')=α(k') and setting the provided time-dependent function r2(t) to r2(k')=φ(k'). Thus, the polarization state of the optical signals osout(t) is varied in dependence on the provided predetermined time-dependent functions r1(t) and r2(t).

The output symbol values ex'(k') and ey'(k'), resulting from the filtering of the input symbol values ex(k') and ey(k'), are then provided to the respective digital-analogue converters DAC1 and DAC.

In this third embodiment of a transmission device TD2, it has been proposed to vary the polarization state of the optical signal osout(t) in a predetermined manner, using either the transformation matrix $U_{TD}$ or the transformation matrix $U_{TDO}$. In order to ensure, that the polarization states of the signal components osout1(t) and osout2(t) remain orthogonal to each other, and to ensure that the signal energies are preserved, the transformation matrices $U_{TD}$ and $U_{TDO}$ are chosen as unitary matrices. A further example $U_{EX}$ of such a unitary transformation matrix, which carries out a variation of the polarization state in dependence on at least one provided time-dependent function, is the matrix $$U_{EX} = \begin{bmatrix} \cos(\alpha(k')) \cdot \exp(-j \cdot \Delta\varphi(k')) & -\sin(\alpha(k')) \\ \sin(\alpha(k')) & \cos(\alpha(k')) \cdot \exp(j \cdot \Delta\varphi(k')) \end{bmatrix}.$$

In this third embodiment, the predetermined deterministic time-dependent functions r1(t) and r2(t) are provided as predetermined deterministic time-discrete functions r1(k')=α(k') and r2(k')=φ(k') by a memory device MEM to the filtering elements F1, F2, F3, F4. The memory device MEM is contained within the transmission device TD1, and is preferably also an integral part of the signal processing unit SPU2. In other words, in this third embodiment the memory device MEM is a provisioning device that provides at least one time-dependent function r1(t), r2(t).

In this third embodiment of a transmission device TD2, the phase of the optical signal os1(t) is modulated in dependence on the symbol values ex(k') and ey(k'), and thus also in dependence on the data values x(k) and y(k). The phase of the optical signal os2(t) is also modulated in dependence on the symbol values ex(k') and ey(k'), and thus also in dependence on the data values x(k) and y(k).

It is to be understood, that it is also proposed in this application a transmission device, that may be a combination of the second embodiment of a transmission device TD1 and the third embodiment of a transmission device TD2. Such a combined transmission device contains an optical processing unit, for performing a variation of the polarization states carried out in the optical domain, as well as a signal processing unit, performing a variation of the polarization states carried out in the time-discrete signal domain.

Figure 4:
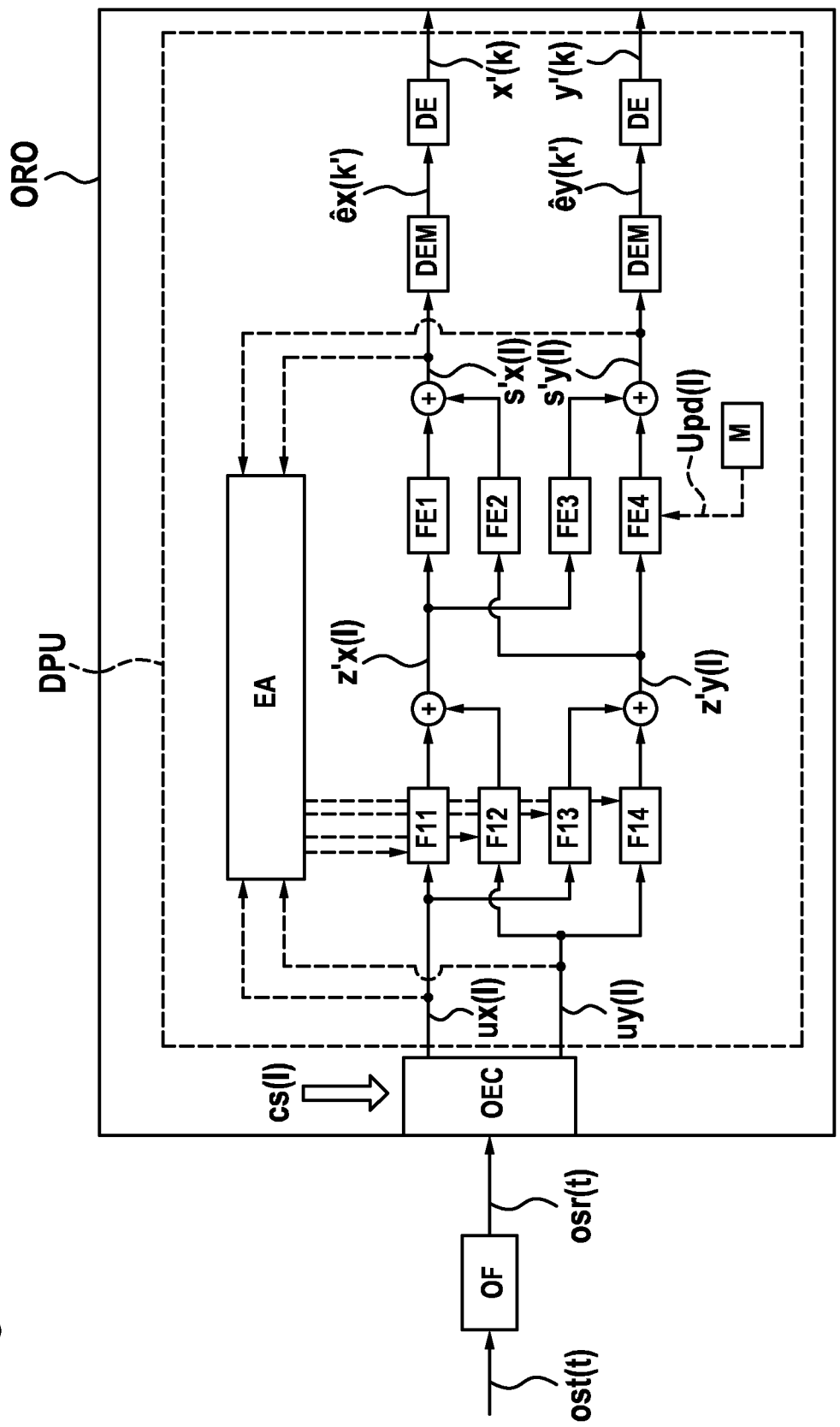
FIG. 4 shows the optical receiving device according to a second embodiment in more detail.

FIG. 4 shows a second embodiment of the optical receiving device ORD. Shown is furthermore a transmitted optical signal ost(t), which may be the optical signal osout"(t) shown in FIG. 2 or the optical signal osout(t) shown in FIG. 3. Furthermore shown is an optical fibre OF, over which the optical signal ost(t) is transmitted. The resulting optical signal osr(t) is received at the optical receiving device ORD.

The optical receiving device ORD contains at least one optical-electrical conversion device OEC. The optical-electrical conversion device OEC performs a phase-coherent mixing of the received optical signal osr(t) with a carrier signal cs(l), for shifting the received optical signal osr(t) in the frequency domain. Then, the device OEC samples the frequency shifted optical signal osr(t) sampled two orthogonal polarization planes. The carrier signals cs(t) is preferably a continuous-wave optical signal with a wavelength that is essentially equal to that of the received optical signal osr(t).

By sampling the frequency shifted optical signal osr(t) in one polarization plane, the optical-electrical conversion device OEC generates a time-discrete electrical signal ux(l), wherein l is the time-discrete index. By sampling the frequency shifted optical signal osr(t) in the other polarization plane, the optical-electrical conversion device OEC generates a time-discrete electrical signal uy(l). For avoiding aliasing effects, the sampling rate $f_U$ of the electrical signals ux(l) and uy(l) is equal to or greater than twice the frequency $f_O$ of the frequency shifted optical signal as $$f_U \geq 2 \cdot f_O.$$

The optical-electrical conversion device OEC contains preferably at least one analogue-digital converter for generating the electrical signals ux(l) and uy(l).

As it has been outlined previously, the linear polarization state of the optical transmission signal ost(t), which results from a combination of the optical signal components os1(t) and os2(t) shown in the FIGS. 2 and 3, may rotate within a non-ideal optical fiber with respect to their orientation at the transmitting side. The orthogonal polarization planes, in which the received signal osr(t) is sampled, are not necessarily identical to the polarization states of the emitted signal components os1(t) and os2(t).

The optical-electrical conversion device OEC provides the time-discrete electrical signals ux(l) and uy(l) to a data processing unit DPU. The data processing unit DPU generates time-discrete output electrical signals s'x(l) and s'y(l) from the sampled electrical signals ux(l) and uy(l).

The data processing unit DPU provides filters F12, F12, F13, F14, for generating intermediate time-discrete signals z'x(l) and z'y(l) from the sampled signals ux(l) and uy(l). The filters F12, F12, F13, F14 are preferably at least four time-discrete finite-impulse response filters. Each time-discrete finite impulse response filter F12, F12, F13, F14 has a filter length of R filter coefficients.

The data processing unit DPU provides furthermore filtering elements FE1, FE2, FE3, FE4, for generating the output signals the signals s'x(l) and s'y(l) from the intermediate time-discrete signals z'x(l) and z'y(l). The filtering elements FE1, FE2, FE3, FE4 are preferably multipliers. Alternatively, the filtering elements FE1, FE2, FE3, FE4 are time-discrete finite impulse response filters with a filter length L.

The data processing unit DPU contains a memory device M, that provides at least one function $U_{POL}(l)$, that is indicative of the predetermined variation of the polarization state of the optical signal osr(t) caused on the transmission side. Preferably, memory device provides a function r1(l) and a matrix $U_{POL}(r1)$, wherein a combination $U_{POL}(r1(l))$ of the function r1(l) and the matrix $U_{POL}(r1)$ are indicative of the predetermined variation of the polarization state caused on the transmission side. The provided time-dependent functions $U_{POL}(l)$, r1(l) are provided as a time-discrete function, which have a time-discrete index l and a sampling rate that is equal to the sampling rate $f_U$ of the sampled signals ux(l) and uy(l).

The filtering elements FE1, FE2, FE3, FE4 filter the signals z'x(l) and z'y(l), such that a variation of polarization states described by the functions $U_{POL}(l)$, r1(l) is compensated. This function $U_{POL}(l)$ is preferably a transformation matrix describing a signal transformation that was carried out at the transmission side.

In the case, that the variation of polarization states is described by a matrix $U_{POL}(r1)$, that depends on only one time-dependent function r1(l), then the memory device M provides this one function r1(l). In the case, that the variation of the polarization state is described by a dependency $U_{POL}(r1, r2)$, that depends on two time-dependent functions r1(l) and r2(l), then the memory device M provides these two functions r1(l) and r2(l).

Assuming, that the transmission device carried out a signal transformation, that could be described by a transformation matrix $$U_{POL}(l) = \begin{bmatrix} \cos(\alpha(l)) & -\sin(\alpha(l)) \\ \sin(\alpha(l)) & \cos(\alpha(l)) \end{bmatrix},$$

then the memory device M provides this transformation matrix $U_{POL}(l)$.

The filtering elements FE1, FE2, FE3, FE4 filter the signals z'x(l) and z'y(l), such that a signal transformation is performed, which is inverse to the signal transformation described by the provided transformation matrix $U_{POL}$. This performed signal transformation may then be described by transformation matrix $U_{INV}$ that is an inverse matrix of the provided transformation matrix $U_{POL}$ as $$U_{INV}(l) = \begin{bmatrix} uinv_1(l) & uinv_2(l) \\ uinv_3(l) & uinv_4(l) \end{bmatrix}$$

-continued
$$= U_{POL}^{-1}(l)$$
$$= \begin{bmatrix} \cos(\alpha(l)) & -\sin(\alpha(l)) \\ \sin(\alpha(l)) & \cos(\alpha(l)) \end{bmatrix}^{-1}.$$

The resulting output signals s'x(l) and s'y(l) are then generated by a transformation, that can be described as $$\begin{bmatrix} s'x(l) \\ s'y(l) \end{bmatrix} = U_{INV}(l) \cdot \begin{bmatrix} z'x(l) \\ z'y(l) \end{bmatrix} = \begin{bmatrix} \cos(\alpha(l)) & -\sin(\alpha(l)) \\ \sin(\alpha(l)) & \cos(\alpha(l)) \end{bmatrix}^{-1} \cdot \begin{bmatrix} z'x(l) \\ z'y(l) \end{bmatrix}.$$

By filtering the signals z'x(l) and z'y(l), such that a signal transformation is performed, which is inverse to the signal transformation previously carried out on the transmission side as described by the provided transformation matrix $U_{POL}$ for varying the polarization state of the transmitted signal, it is enabled, that the polarization states may be varied at a variation rate, which may even be as high as the symbol rate $f_{SYM}$.

Alternatively to providing as the dependency the matrix $U_{POL}(l)$, the memory device M provides a set S of functions as $$S = \{f_1(l), f_2(l), f_3(l), f_4(l)\},$$

wherein
the function $f_1(l)$ is equal to the time-dependent coefficient $uinv_1(l)$,
the function $f_2(l)$ is equal to the time-dependent coefficient $uinv_2(l)$,
the function $f_3(l)$ is equal to the time-dependent coefficient $uinv_3(l)$, and
the function $f_4(l)$ is equal to the time-dependent coefficient $uinv_4(l)$.

Alternatively to providing as the dependency the matrix $U_{POL}(l)$, the memory device M provides directly the function $U_{INV}(l)$ as a function that is indicative of a predetermined variation of the polarization state of the received signal osr(t).

In order to enable a consideration of a time-delay caused between the transmission device and the receiving device, the memory device M provides a time-delay value $\Delta\tau$ indicating this time-delay. This time-delay value $\Delta\tau$ is a predefined value, which may be provided to the optical reception device ORD by a network manager or alternatively determined during a measurement carried out by the transmission device and the optical reception device ORD. This time-delay value $\Delta\tau$ is transferred into the time-discrete domain in dependence on the sampling rate $f_U$, yielding the time-discrete delay value $\Delta l$ as $$\Delta l = \Delta\tau \cdot f_U.$$

The inverse transformation matrix $U_{INV}$ is then determined as $$U_{INV}(l) = \begin{bmatrix} uinv_1(l) & uinv_2(l) \\ uinv_3(l) & uinv_4(l) \end{bmatrix}$$
$$= U_{POL}^{-1}(l - \Delta l)$$
$$= \begin{bmatrix} \cos(\alpha(l - \Delta l)) & -\sin(\alpha(l - \Delta l)) \\ \sin(\alpha(l - \Delta l)) & \cos(\alpha(l - \Delta l)) \end{bmatrix}^{-1}.$$

The resulting output signals s'x(l) and s'y(l) are then generated by a signal transformation, that can be described as $$\begin{bmatrix} s'x(l) \\ s'y(l) \end{bmatrix} = U_{INV}(l) \cdot \begin{bmatrix} z'x(l) \\ z'y(l) \end{bmatrix}$$

$$= \begin{bmatrix} \cos(\alpha(l-\Delta l)) & -\sin(\alpha(l-\Delta l)) \\ \sin(\alpha(l-\Delta l)) & \cos(\alpha(l-\Delta l)) \end{bmatrix}^{-1} \cdot \begin{bmatrix} z'x(l) \\ z'y(l) \end{bmatrix}.$$

In the case that the filtering elements FE1, FE2, FE3 and FE4 are multiplication elements with respective multiplication coefficients m1(l), m2(l), m3(l) and m4(l), then these multiplication coefficients may be determined as $m1 = uinv_1(l),$ $m2 = uinv_2(l),$ $m3 = uinv_3(l),$ $m4 = uinv_4(l).$ In the case that the filtering elements FE1, FE2, FE3 and FE4 are time-discrete finite impulse response filters with filter length L and respective filter coefficients $h_{FE1}(p)$, $h_{FE2}(p)$, $h_{FE3}(p)$, $h_{FE4}(p)$, with the coefficient index p=0 ... L−1, then the filter coefficients $h_{FE1}(p)$, $h_{FE2}(p)$, $h_{FE3}(p)$, $h_{FE4}(p)$ may be determined, by setting the filter coefficients for an arbitrarily chosen but fixed index p=P to $h_{FE1}(P) = uinv_1(l),$ $h_{FE2}(P) = uinv_2(l),$ $h_{FE3}(P) = uinv_3(l),$ $h_{FE4}(P) = uinv_4(l),$ while choosing all other filter coefficients for p≠P to zero as $h_{FE1}(p \neq P) = 0,$ $h_{FE2}(p \neq P) = 0,$ $h_{FE3}(p \neq P) = 0,$ $h_{FE4}(p \neq P) = 0.$ The data processing unit DPU uses the signals ux(l), uy(l), s'x(l) and s'y(l), for deriving optimized filter coefficients hxx, hxy, hyx, hyy of the filters F12, F12, F13, F14, such that the electrical signals s'x(l) and s'y(l) represent sampled versions of respective orthogonal optical signal. The data processing unit DPU provides the electrical signal ux(l) to the filters F1 and F3, and the electrical signal uy(l) to the filters F2 and F4. The output signals of the filters F1 and F2 are combined to an electrical signal z'x(l). The output signals of the filters F3 and F4 are combined to an electrical signal z'y(l). The electrical signals z'x(l) and z'y(l) are provided to the filtering elements FE1, FE2, FE3 and FE4.

The input electrical signals ux(l) and uy(l) and the output electrical signals s'x(l) and s'y(l) are used in the data processing unit DPU for determining the filter coefficients of the filters F12, F12, F13, F14. For deriving the optimized filter coefficients, the data processing unit DPU carries out an equalization algorithm, such as for example the CM Algorithm, as described in "Digital Coherent Optical Receivers: Algorithms and Subsystems, Seb J. Savory, IEEE JOURNAL OF SELECTED TOPICS IN QUANTUM ELECTRONICS, VOL. 16, NO. 5, SEPTEMBER/OCTOBER 20102", or alternatively one of the algorithms as proposed in "Stop-and-go algorithm for blind equalization in QAM single-carrier coherent optical systems, T. Foggi, G. Colavolpe, and G. Prati, IEEE Photonics Technology Letters, vol. 22, pp. 1838-1840, Dec. 15, 2010".

The resulting electrical signals s'x(l) and s'y(l) are used in a demodulation step DEM by the data processing unit DPU, for demodulating respective estimated symbol values êx(k') and êy(k') from these signals. Furthermore, in order to obtain estimates of the transmitted data signals x(k) and y(k), respective estimated data values x'(k) and y'(k) are de-mapped from the estimated symbol values êx(k') and êy(k') by the data processing unit DPU in a de-mapping step DE. These estimates of the transmitted data signals x(k) and y(k) are then provided to a unit of FEC decoding, not shown in FIG. 3, for obtaining respective data streams from the estimates of the data values x'(k) and y'(k). The FEC decoding unit may be connected to the optical receiving device ORD via a data interface. Alternatively, the FEC decoding unit is an integral part of the optical receiving device ORD.

In the above described embodiment of an optical receiving device ORD, the estimated data values x'(k) are derived from the filtered signal s'x(l), while the estimated data values y'(k) are derived from the filtered signal s'y(l).

In the above described embodiment of an optical receiving device ORD, intermediate signals z'x(l) and z'y(l) are derived from the sampled signals ux(l) and uy(l) using filters F12, F12, F13, F14 that are controlled by an equalization algorithm, while in a next following step, output signals s'x(l) and s'y(l) are generated from the intermediate signals z'x(l) and z'y(l) using filtering elements FE1, FE2, FE3, FE4 that perform a signal transformation in accordance with to a provided predetermined function $U_{POL}$.

In the above described embodiment of an optical receiving device ORD, the signals os1(t) and os2(t) are optical signals possessing respective linear polarization states that are essentially orthogonal to each other. The above described embodiment is not limited to linear polarization states. Alternatively, the signals os1(t) and os2(t) are optical signals possessing respective circular polarization states that are essentially orthogonal to each other. As an even further alternative, the signals os1(t) and os2(t) are optical signals possessing respective elliptical polarization states that are essentially orthogonal to each other. The above described principles of compensating a polarization variation can be applied not only to signals possessing linear orthogonal polarization states, but also to signals possessing circular or elliptical polarization states that are essentially orthogonal to each other. A person of skill in the art would readily recognize that steps of various above-described methods can be performed by programmed computers or programmable elements, such as digital signal processors.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGS. 1, 2 and 3, including any functional blocks labeled as "device" or "unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the terms "processing unit", "device" or "unit" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. It should be appreciated by those skilled in the art that any block diagrams herein represent conceptual views of illustrative circuitry embodying the principles of the invention.

The invention claimed is:

1. A method of optical data transmission, comprising:
   inputting a first signal into a first controlled time-discrete filter;
   inputting a second signal into a second controlled time-discrete filter, wherein said first signal and said second signal are separate from each other as they traverse their respective controlled time-discrete filter;
   generating a first optical signal by modulating a phase of a first monochromatic optical signal with an output of said first controlled time-discrete filter;
   generating a second optical signal by modulating a phase of a second monochromatic optical signal with an output of said second controlled time-discrete filter, wherein said first optical signal and said second optical signal possess
      a same wavelength,
      respective phases, which are modulated in dependence on respective data values and in accordance with a phase-shift keying method, and
      respective polarization states, which are essentially orthogonal to each other;
   generating a combined optical signal, by combining said first optical signal and said second optical signal, wherein said combined optical signal possesses a polarization state with a predetermined variation determined by the controlled time-discrete filters, and wherein said respective polarization states of said first optical signal and said second optical signal remain orthogonal to each other; and
   transmitting said combined optical signal over an optical transmission line, the method further comprising,
   receiving said combined optical signal;
   generating at least two time-discrete sampled signals, by sampling the received combined optical signal along two orthogonal polarization planes;
   generating at least two filtered signals, by filtering said at least two time-discrete sampled signals in a time-discrete domain, using a function indicative of said respective predetermined variations; and
   deriving respective data values from said at least two filtered signals.

2. The method according to claim 1, wherein the generation of said at least two time-discrete sampled signals comprises:
   frequency shifting said received combined optical signal, performing a phase-coherent mixing of said received combined optical signal with a carrier signal, and
   sampling the frequency shifted optical signal along two orthogonal polarization planes.

3. The method according to claim 1, wherein said polarization state is varied, by modifying said combined optical signal in an optical domain, using at least one predetermined signal.

4. The method according to claim 1, wherein the step of generating said combined optical signal, by combining said first optical signal and said second optical signal, comprises:
   generating first symbol values and second symbol values, using said data values and a phase-shift keying modulation scheme,
   varying said polarization state of said combined optical signal, by varying the polarization states of said first optical signal and said second optical signal, by
      filtering said first symbol values and said second symbol values in the time-discrete signal domain, using at least one predetermined function, and
      modulating the phases of said first optical signal and said second optical signal, using the filtered first symbol values and second symbol values.

5. An optical transmission device, comprising:
   a first controlled time-discrete filter adapted to input a first signal;
   a second controlled time-discrete filter adapted to input a second signal, wherein said first signal and said second signal are separate from each other as they traverse their respective controlled time-discrete filter;
   a first modulation device adapted to generate a first optical signal by modulating a phase of a first monochromatic optical signal with an output of said first controlled time-discrete filter;
   a second modulation device adapted to generate a second optical signal by modulating a phase of a second monochromatic optical signal with an output of said second controlled time-discrete filter, wherein said first optical signal and said second optical signal possess
      a same wavelength,
      respective phases, which are modulated in dependence on respective data values and in accordance with a phase-shift keying method, and
      respective polarization states, which are essentially orthogonal to each other;
   an optical combiner adapted to generate a combined optical signal, by combining said first optical signal and said second optical signal, wherein said combined optical signal possesses a polarization state with a predetermined variation determined by the controlled time-discrete filters, and wherein said respective polarization states of said first optical signal and said second optical signal remain orthogonal to each other; and
   a transmitter adapted to transmit said combined optical signal into an optical transmission line.

6. The optical transmission device according to claim 5, further adapted to vary said polarization state, by modifying said combined optical signal in an optical domain, using at least one predetermined signal.

7. The optical transmission device according to claim 5, further adapted to:
   generate first symbol values and second symbol values, using said data values and a phase-shift keying modulation scheme,
   vary said polarization state of said combined optical signal, by varying the polarization states of said first optical signal and said second optical signal, by filtering said first symbol values and said second symbol values in the time-discrete signal domain, using at least one predetermined function, and modulating the phases of said first optical signal and said second optical signal, using the filtered first symbol values and second symbol values.

8. An optical receiving device, comprising:

an optical interface adapted to receive an optical signal from a transmission device;

a digital-to-analog converter adapted to generate at least two time-discrete sampled signals by sampling the received optical signal along two orthogonal polarization planes;

a time-discrete filter adapted to generate at least two filtered signals, by filtering said at least two time-discrete sampled signals in a time-discrete domain using a function indicative of predetermined variations of polarization states, wherein the predetermined variations are determined by controlled time-discrete filtering at the transmission device according to claim 5; and a digital-signal processor adapted to derive respective data values from said at least two filtered signals.

9. The optical receiving device according to claim 8, further adapted to:

generate said at least two time-discrete sampled signals, by frequency shifting said received optical signal, by performing a phase-coherent mixing of said received optical signal with a carrier signal, and sampling the frequency shifted optical signal along two orthogonal polarization planes.

10. An optical transmission device, comprising:

a first controlled time-discrete filter adapted to input a first signal;

a second controlled time-discrete filter adapted to input a second signal, wherein said first signal and said second signal are separate from each other as they traverse their respective controlled time-discrete filter;

a first modulation device adapted to generate a first optical signal by modulating a phase of a first monochromatic optical signal with an output of said first controlled time-discrete filter;

a second modulation device adapted to generate a second optical signal by modulating a phase of a second monochromatic optical signal with an output of said second controlled time-discrete filter, wherein said first optical signal and said second optical signal possess a same wavelength, respective phases, which are modulated in dependence on respective data values and in accordance with a phase-shift keying method, and respective polarization states, which are essentially orthogonal to each other;

an optical combiner adapted to generate a combined optical signal, by combining said first optical signal and said second optical signal, wherein said combined optical signal possesses a polarization state with a predetermined variation, and wherein said respective polarization states of said first optical signal and said second optical signal remain orthogonal to each other; and a transmitter adapted to transmit said combined optical signal into an optical transmission line.

* * * * *